US011878517B2

(12) United States Patent
Arakane et al.

(10) Patent No.: US 11,878,517 B2
(45) Date of Patent: Jan. 23, 2024

(54) LIQUID DISCHARGING APPARATUS, CONTROLLING METHOD FOR LIQUID DISCHARGING APPARATUS AND MEDIUM STORING CONTROLLING PROGRAM FOR LIQUID DISCHARGING APPARATUS

(71) Applicant: Brother Kogyo Kabushiki Kaisha, Nagoya (JP)

(72) Inventors: Satoru Arakane, Nagoya (JP); Tomohiro Nodsu, Seto (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 296 days.

(21) Appl. No.: 17/399,403

(22) Filed: Aug. 11, 2021

(65) Prior Publication Data

US 2022/0063263 A1 Mar. 3, 2022

(30) Foreign Application Priority Data

Aug. 31, 2020 (JP) ................................ 2020-145598

(51) Int. Cl.
*B41J 2/045* (2006.01)
*B41J 2/135* (2006.01)

(52) U.S. Cl.
CPC ........... *B41J 2/04501* (2013.01); *B41J 2/135* (2013.01)

(58) Field of Classification Search
CPC .. B41J 2/04501; B41J 2/0453; B41J 2/04586; B41J 2/135
See application file for complete search history.

(56) References Cited

U.S. PATENT DOCUMENTS

| | | | | |
|---|---|---|---|---|
| 7,264,326 | B2 * | 9/2007 | Kubo | B41J 2/04563 347/17 |
| 2007/0070108 | A1 * | 3/2007 | Mantell | B41J 2/2146 347/19 |
| 2007/0291074 | A1 | 12/2007 | Kawamata et al. | |
| 2013/0093815 | A1 | 4/2013 | Kawamata et al. | |

FOREIGN PATENT DOCUMENTS

| | | | |
|---|---|---|---|
| JP | 2006-240258 | A | 9/2006 |
| JP | 2007-331309 | A | 12/2007 |
| JP | 2013-184447 | A | 9/2013 |

* cited by examiner

*Primary Examiner* — Thinh H Nguyen
(74) *Attorney, Agent, or Firm* — Banner & Witcoff, Ltd.

(57) ABSTRACT

A liquid discharging apparatus includes: a head having a plurality of nozzles; and a controller. The controller executes: a discharging processing of discharging liquid, from each of the nozzles toward a recording medium, in a liquid droplet amount which is selected for each of pixels from at least three kinds of liquid droplet amounts; and a total discharge amount calculating processing of calculating a total discharge amount of the liquid to be discharged from the nozzles in the discharging processing, based on the liquid droplet amount selected for each of the pixels and a discharge duty which is density of the liquid droplet per a unit area of the recording medium.

11 Claims, 15 Drawing Sheets

FIG. 7A

| RECORDING CYCLE | | CORRECTION VALUE |
|---|---|---|
| T1 | T2 | |
| LARGE | LARGE | A INCREASE |
| LARGE | SMALL | A |
| MEDIUM | LARGE | B |
| SMALL | MEDIUM | B |
| ZERO | SMALL | C |
| ZERO | LARGE | C DECREASE |

CORRECTION AMOUNT

FIG. 7B

| DISCHARGE DUTY | CORRECTION VALUE |
|---|---|
| ... | ... |
| 60% | 1.1 |
| 50% | 1.0 |
| 40% | 0.9 |
| ... | ... |

FIG. 7C

| DISCHARGING PERFORMANCE RANK | CORRECTION VALUE |
|---|---|
| LARGE 1 | A INCREASE |
| 2 | B |
| SMALL 3 | C DECREASE |

DISCHARGE AMOUNT

CORRECTION AMOUNT

FIG. 7D

| VOLTAGE RANK | CORRECTION VALUE |
|---|---|
| LARGE 1 | A INCREASE |
| 2 | B |
| SMALL 3 | C DECREASE |

DISCHARGE AMOUNT

CORRECTION AMOUNT

FIG. 7E

| VISCOSITY | ENVIRONMENTAL TEMPERATURE (C°) | CORRECTION VALUE | CORRECTION AMOUNT |
|---|---|---|---|
| HIGH | LESS THAN 10°C | C | DECREASE |
| ↕ | IN A RANGE OF NOT LESS THAN 10°C TO LESS THAN 20°C | B | ↕ |
| LOW | NOT LESS THAN 20°C | A | INCREASE |

VISCOSITY — CORRECTION AMOUNT

FIG. 7F

| RECORDING MODE | RECORDING RESOLUTION (dpi) | DRIVING FREQUENCY (kHz) | LIQUID DROPLET AMOUNT (pl) | | | CORRECTION VALUE |
|---|---|---|---|---|---|---|
| | | | SMALL | MEDIUM | LARGE | |
| HIGH SPEED | 600 x 300 | 26 | 5 | 10 | 20 | B |
| NORMAL | 600 x 300 | 16 | 5 | 15 | 30 | A |
| HIGH IMAGE QUALITY | 1200 x 600 | 16 | 5 | 10 | 15 | C |

FIG. 8

| DISCHARGE DUTY | C CORRECTION VALUE | M CORRECTION VALUE | Y CORRECTION VALUE | K CORRECTION VALUE |
|---|---|---|---|---|
| ... | ... | ... | ... | ... |
| 60% | 1.1 | 1.2 | 1.2 | 1.1 |
| 50% | 1.0 | 1.0 | 1.0 | 1.0 |
| 40% | 0.9 | 0.8 | 0.8 | 0.9 |
| ... | ... | ... | ... | ... |

FIG. 9

| DISCHARGE DUTY | RATIO OF LIQUID DROPLET AMOUNTS(%) | | | CORRECTION VALUE |
|---|---|---|---|---|
| | SMALL | MEDIUM | LARGE | |
| ... | ... | ... | ... | ... |
| 60% | 0 | 0 | 100 | a |
| | 0 | 10 | 90 | b |
| | 0 | 20 | 80 | c |
| | ... | ... | ... | ... |
| 50% | 0 | 0 | 100 | d |
| | 0 | 10 | 90 | e |
| | 0 | 20 | 80 | f |
| | ... | ... | ... | ... |
| 40% | 0 | 0 | 100 | g |
| | 0 | 10 | 90 | h |
| | 0 | 20 | 80 | i |
| | ... | ... | ... | ... |
| ... | ... | ... | ... | ... |

LIQUID DISCHARGING APPARATUS, CONTROLLING METHOD FOR LIQUID DISCHARGING APPARATUS AND MEDIUM STORING CONTROLLING PROGRAM FOR LIQUID DISCHARGING APPARATUS

CROSS REFERENCE TO RELATED APPLICATIONS

The present application claims priority from Japanese Patent Application No. 2020-145598, filed on Aug. 31, 2020, the disclosure of which is incorporated herein by reference in its entirety.

BACKGROUND

The present disclosure relates to a liquid discharging apparatus provided with a head having a plurality of nozzles, and a controller, wherein the controller is configured to execute a grading discharging processing and a total discharge amount calculating processing, a controlling method for controlling the liquid discharging apparatus and a medium storing a controlling program for the liquid discharging apparatus.

Description of the Related Art

There is known an ink-jet recording apparatus (liquid discharging apparatus) which is configured to be capable of changing a liquid droplet amount of an ink to be discharged or ejected from each of nozzles (discharging processing).

SUMMARY

There is such a case that a total discharge amount of the liquid (to be) discharged from the nozzles is calculated in order to detect a remaining amount of the liquid in a liquid tank, etc. In such a case, in the configuration wherein the discharging processing is executed as the ink-jet recording apparatus as described above, it is considered to calculate the total discharge amount by multiplying four kinds of liquid droplet amounts (0 (zero), small, medium, large), which are used in the discharging processing, by numbers of dots of the liquid each corresponding to one of the four kinds of liquid droplet amounts.

An amount of the liquid which is actually discharged from the nozzles, however, is changed by a discharge duty (density of the liquid droplets per unit area of the recording medium), and thus there might be a large difference between the calculated total discharge amount as described above and an actual total discharge amount.

An object of the present disclosure is to provide a liquid discharging apparatus capable of obtaining the total discharge amount with high precision, a controlling method for the liquid discharging apparatus and a medium storing a controlling program for the liquid discharging apparatus.

According to a first aspect of the present disclosure, there is provided a liquid discharging apparatus including:

a head having a plurality of nozzles; and a controller, wherein the controller is configured to execute:

- a discharging processing of discharging liquid, from each of the nozzles toward a recording medium, in a liquid droplet amount which is selected for each of pixels from at least three kinds of liquid droplet amounts; and
- a total discharge amount calculating processing of calculating a total discharge amount of the liquid to be discharged from the nozzles in the discharging processing, based on the liquid droplet amount selected for each of the pixels and a discharge duty which is density of the liquid droplet per a unit area of the recording medium.

According to a second aspect of the present disclosure, there is provided a controlling method for controlling a liquid discharging apparatus including a head having a plurality of nozzles, the controlling method including:

- a discharging processing of discharging liquid, from each of the nozzles toward a recording medium, in a liquid droplet amount which is selected for each of pixels from at least three kinds of liquid droplet amounts; and
- a total discharge amount calculating processing of calculating a total discharge amount of the liquid to be discharged from the nozzles in the discharging processing, based on the liquid droplet amount selected for each of the pixels and a discharge duty which is density of the liquid droplet per a unit area of the recording medium.

According to a third aspect of the present disclosure, there is provided a non-transitory medium storing a program for controlling a liquid discharging apparatus including a head having a plurality of nozzles, and a controller, the program, when executed by the controller, causing the liquid discharging apparatus to execute:

- a discharging processing of discharging liquid, from each of the nozzles toward a recording medium, in a liquid droplet amount which is selected for each of pixels from at least three kinds of liquid droplet amounts; and
- a total discharge amount calculating processing of calculating a total discharge amount of the liquid to be discharged from the nozzles in the discharging processing, based on the liquid droplet amount selected for each of the pixels and a discharge duty which is density of the liquid droplet per a unit area of the recording medium.

According to the present disclosure, it is possible to obtain the total discharge amount highly precisely by calculating the total discharge amount based on the discharge duty.

BRIEF DESCRIPTION OF THE DRAWINGS

FIG. 7A is a view depicting a table to which the CPU refers in step S4 of FIG. 5A; FIG. 7B is a view depicting a table to which the CPU refers in step S9 of FIG. 5B; and FIGS. 7C to 7F are each a view depicting a table to which the CPU refers in step S16 of FIG. 5B.

FIG. 8 is a view depicting a table to which the CPU refers in step S9 of FIG. 5B in a second embodiment of the present disclosure.

FIG. 9 is a view depicting a table to which the CPU refers in step S9 of FIG. 5B in a third embodiment of the present disclosure.

DETAILED DESCRIPTION

First Embodiment

First, the overall configuration of a printer 100 according to a first embodiment of the present disclosure and the configuration of respective parts of the printer 100 will be explained, with reference to FIGS. 1 to 3.

Figure 1:
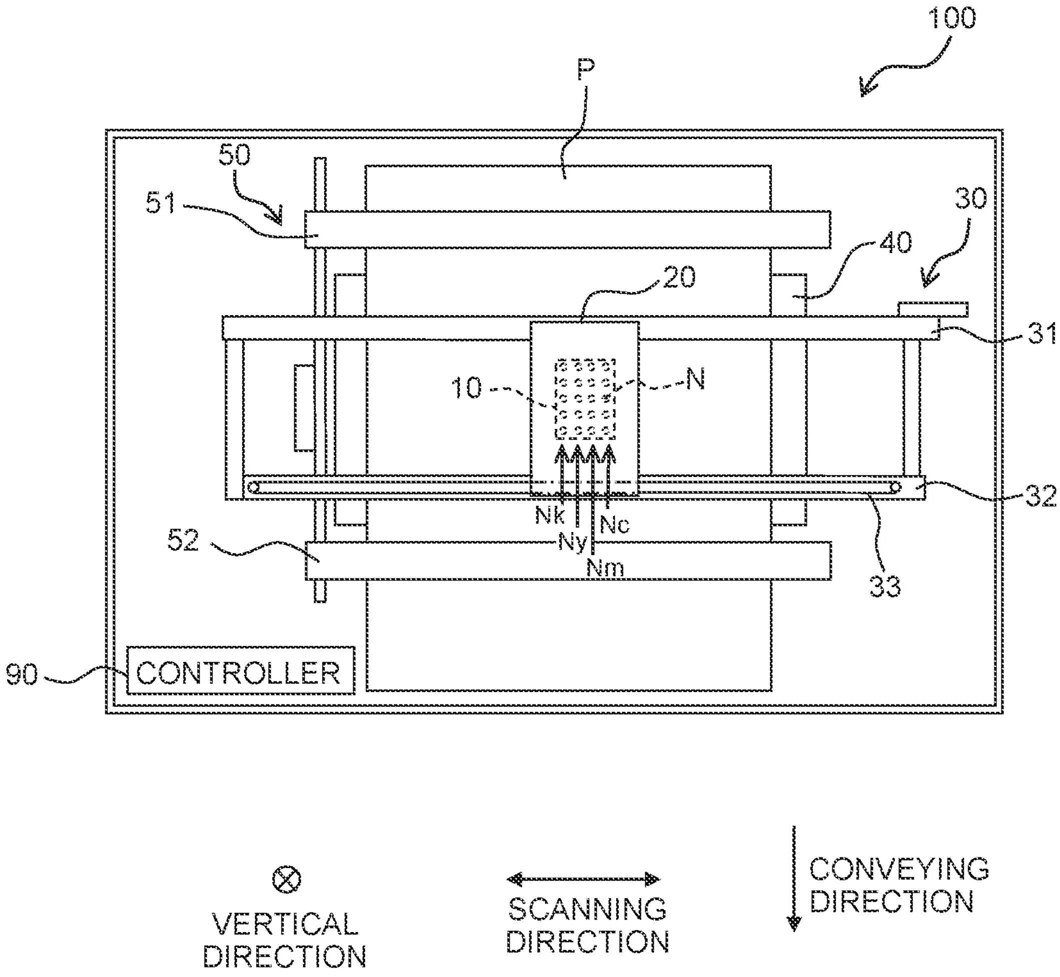
FIG. 1 is a plan view depicting the overall configuration of a printer according to a first embodiment of the present disclosure.

As depicted in FIG. 1, the printer 100 is provided with: a head 10 having a plurality of nozzles N formed in a lower surface thereof; a carriage 20 holding the head 10; a scanning mechanism 30 moving the carriage 20 and the head 10 in a scanning direction (a direction orthogonal to the vertical direction); a platen 40 supporting a paper sheet (paper) P (recording medium) from therebelow; a conveyor 50 conveying the paper sheet P in a conveying direction (a direction orthogonal to the scanning direction and the vertical direction); and a controller 90.

The plurality of nozzles N construct four nozzle rows (nozzle arrays) Nc, Nm, Ny and Nk arranged side by side in the scanning direction. Each of the nozzle rows Nc, Nm, Ny and Nk is constructed of nozzles N, among the plurality of nozzles N, arranged side by side in the conveying direction. The nozzles N constructing the nozzle row Nc discharge a cyan ink, the nozzles N constructing the nozzle row Nm discharge a magenta ink; the nozzles N constructing the nozzle row Ny discharge a yellow ink, and the nozzles N constructing the nozzle row Nk discharge a black ink.

The scanning mechanism 30 includes a pair of guides 31 and 32 supporting the carriage 20, and a belt 33 connected to the carriage 20. The pair of guides 31 and 32 and the belt 33 extend in the scanning direction. In a case that a carriage motor 30*m* (see FIG. 3) is driven by control of the controller 90, the belt 33 runs, thereby causing the carriage 20 and the head 10 to move in the scanning direction along the pair of guides 31 and 32.

The platen 40 is arranged at a location below the carriage 20 and the head 10. The paper sheet P is supported by an upper surface of the platen 40.

The conveyor 50 has two roller pairs 51 and 52. In the conveying direction, the head 10, the carriage 20 and the platen 40 are arranged between the roller pair 51 and the roller pair 52. In the case that a conveying motor 50*m* (see FIG. 3) is driven by the control of the controller 90, the roller pairs 51 and 52 rotate in a state that the paper sheet P is pinched therebetween, thereby conveying the paper sheet P in the conveying direction.

Figure 2:
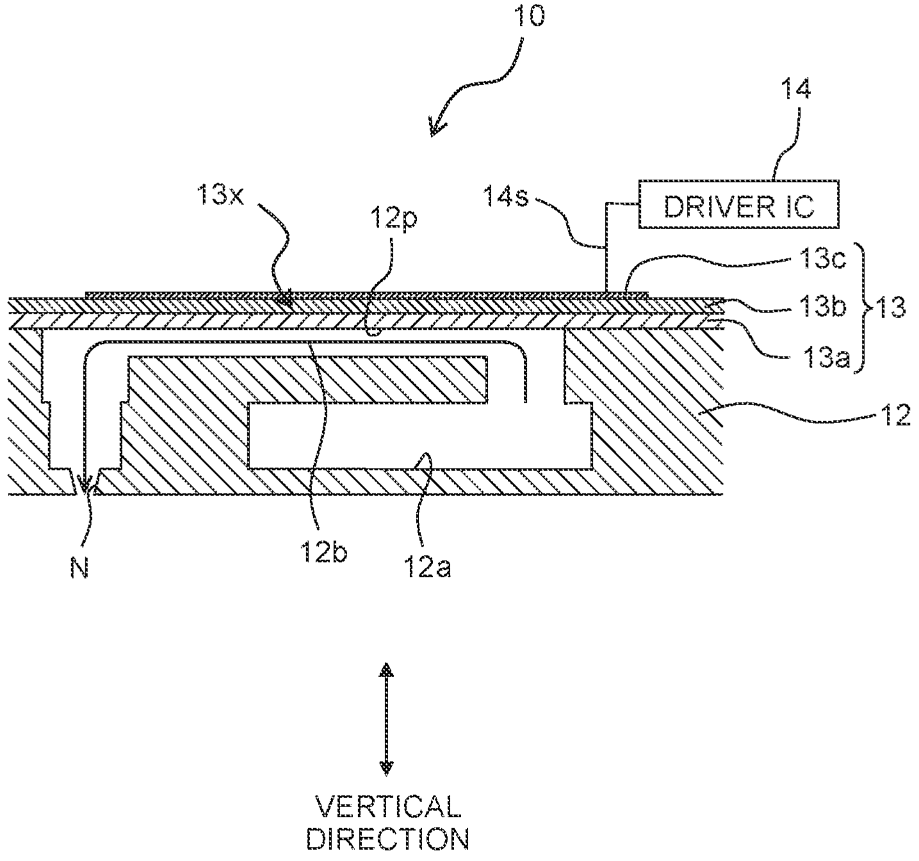
FIG. 2 is a cross-sectional view of a head depicted in FIG. 1.

As depicted in FIG. 2, the head 10 includes a channel unit 12 and an actuator unit 13.

The plurality of nozzles N (see FIG. 1) are formed in a lower surface of the channel unit 12. A common channel 12*a* which communicates with an ink tank (not depicted in the drawings), and a plurality of individual channels 12*b* each of which communicates with one of the plurality of nozzles N are formed in the inside of the channel unit 12. Each of the plurality of individual channels 12*b* is a channel from an outlet of the common channel 12*a* and reaching one of the nozzles N via a pressure chamber 12*p*. A plurality of pieces of the pressure chamber 12*p* are opened in an upper surface of the channel unit 12.

The actuator unit 13 includes a metallic vibration plate 13*a* arranged on the upper surface of the channel unit 12 so as to cover the plurality of pressure chambers 12*p*, a piezoelectric layer 13*b* arranged on an upper surface of the vibration plate 13*a*, and a plurality of individual electrodes 13*c* each of which is arranged on an upper surface of the piezoelectric layer 13*b* so as to face one of the plurality of pressure chambers 12*p*.

The vibration plate 13*a* and the plurality of individual electrodes 13*c* are electrically connected to a driver IC 14. The driver IC 14 maintains the potential of the vibration plate 13 at the ground potential, whereas the driver IC 14 changes the potential of each of the plurality of individual electrodes 13*c*. Specifically, the driver IC 14 generates a driving signal based on a control signal (a waveform signal FIRE and a selection signal SIN) from the controller 90, and supplies the driving signal to each of the plurality of individual electrodes 13*c* via a signal line 14*s*. With this, the potential of the plurality of individual electrode 13*c* is changed between a predetermined driving potential (VDD) and the ground potential (0V) (see FIG. 4). In this situation, parts (actuator 13*x*) of the vibration plate 13*a* and the piezoelectric layer 13*b*, respectively, which are sandwiched between each of the plurality of individual electrodes 13*c* and one of the pressure chambers 12*p* corresponding thereto are deformed. With this, the volume of the pressure chamber 12*p* is changed and pressure is applied to the ink inside the pressure chamber 12*p*. As a result, the ink is discharged from the nozzle N. The actuator 13*x* is provided as a plurality of actuators 13*x* each of which is provided on one of the plurality of individual electrodes 13*c* (namely, on one of the nozzles N); each of the plurality of actuators 13*x* is deformable independently in accordance with the potential supplied to each of the plurality of individual electrodes 13*c*.

Figure 3:
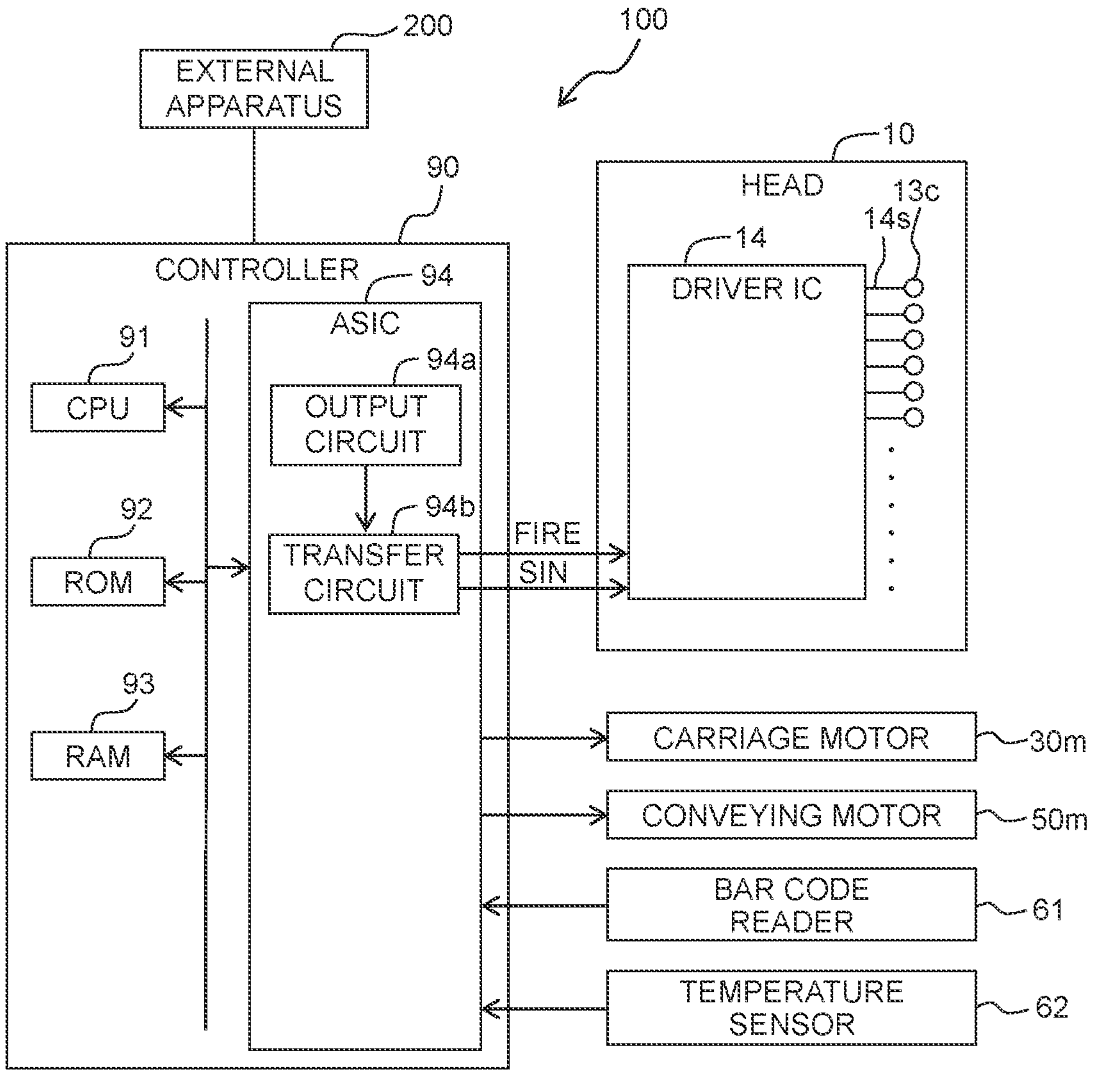
FIG. 3 is a block diagram depicting the electrical configuration of the printer of FIG. 1.
Figure 4A:
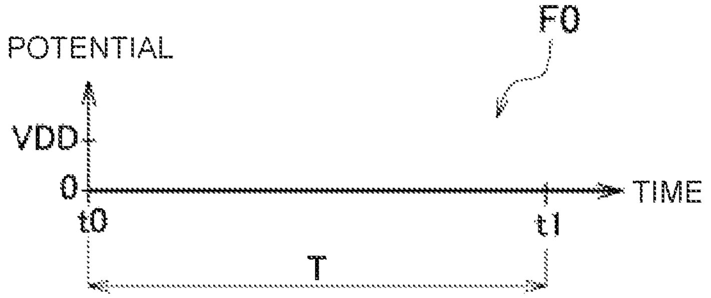
FIGS. 4A to 4D are waveform charts indicating four kinds of waveform data included in a waveform signal FIRE.
Figure 4B:
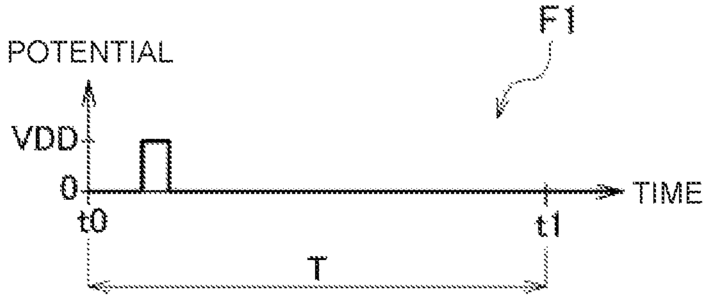
Figure 4C:
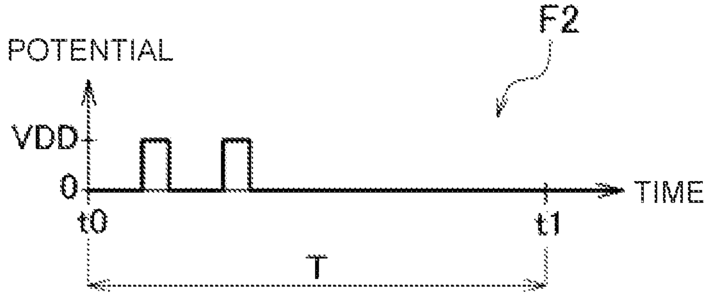
Figure 4D:
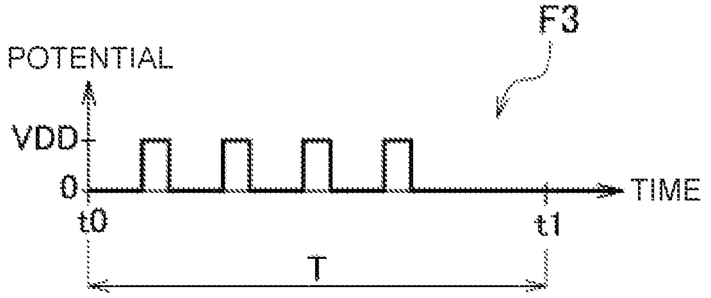

As depicted in FIG. 3, the controller 90 includes a CPU (Central Processing Unit) 91, a ROM (Read Only Memory) 92, a RAM (Random Access Memory) 93 and an ASIC (Application Specific Integrated Circuit) 94. Among the above-described elements, the CPU 91 and the ASIC 94 correspond to a "controller" of the present disclosure, and the ROM 92 corresponds to a "memory" of the present disclosure.

A program and data for allowing the CPU 91 and/or the ASIC 94 to perform a variety of kinds of control are stored in the ROM 92. The RAM 93 temporarily stores data which is used by the CPU 91 and/or the ASIC 94 in a case of executing a program. The controller 90 is connected to an external apparatus (personal computer, etc.) 200 so that the controller 90 is capable of communicating with the external apparatus 200, and executes a recording processing, etc., with the CPU 91 and/or the ASIC 94 based on data inputted from the external apparatus 200 or from an input part of the printer 100 (a switch, a button, etc., provided on an outer surface of a casing of the printer 100).

In the recording processing, the ASIC 94 drives the driver IC 14, the carriage motor 30*m* and the conveying motor 50*m*, by following an instruction from the CPU 91 and based on a recording instruction or command received from the external apparatus 200, etc., so as to alternately perform a conveying operation of causing the conveyor 50 to convey the paper sheet P by a predetermined amount in the conveying direction, and a scanning operation of discharging the ink(s) from the nozzles N while moving the carriage 20 and the head 10 in the scanning direction. With this, dots of the ink(s) are formed on the paper sheet P, and an image is recorded on the paper sheet P.

As depicted in FIG. 3, the ASIC 94 includes an output circuit 94*a* and a transfer circuit 94*b*.

The output circuit 94*a* generates the waveform signal FIRE and the selection signal SIN, and outputs these signals FIRE and SIN to the transfer circuit 94*a* for every recording cycle T. One piece of the recording cycle T is a time required for the paper sheet P to move relative to the head 10 only by a unit distance corresponding to the resolution of an image to be formed on the paper sheet P, and one piece of the recording cycle T corresponds to one pixel (picture element).

The waveform signal FIRE is a signal in which four pieces of waveform data F0 to F3 (see FIGS. 4A to 4D) are arranged in series. The waveform data F0 (see FIG. 4A) corresponds to a liquid droplet amount, of the ink to be discharged from the nozzle N within one piece of the recording cycle T (one recording cycle T: time from a point of time t0 to a point of time t1), which is "0 (zero; no discharge"). The waveform data F0 maintains the potential of the individual electrode 13*c* to the ground potential (0V). The waveform data F1 (see FIG. 4B) corresponds to a liquid droplet amount, of the ink to be discharged from the nozzle N within the one recording cycle T, which is "small". The waveform data F1 includes one pulse changing the potential of the individual electrode 13*c* between the ground potential (0V) and the driving potential (VDD), and causes one droplet of the ink to be discharged from the nozzle N. The waveform data F2 (see FIG. 4C) corresponds to a liquid droplet amount, of the ink to be discharged from the nozzle N within the one recording cycle T, which is "medium". The waveform data F2 includes two pulses changing the potential of the individual electrode 13*c* between the ground potential (0V) and the driving potential (VDD), and causes two droplets of the ink to be discharged from the nozzle N. The waveform data F3 (see FIG. 4D) corresponds to a liquid droplet amount, of the ink to be discharged from the nozzle N within the one recording cycle T, which is "large". The waveform data F3 includes four pulses changing the potential of the individual electrode 13*c* between the ground potential (0V) and the driving potential (VDD), and causes four droplets of the ink to be discharged from the nozzle N.

The selection signal SIN is a serial signal including selecting data for selecting one waveform data among the four pieces of the waveform data F0 to F3 as described above. The selection signal SIN is generated for each of the actuators 13*x* and for each recording cycle T based on the image data included in the recording instruction.

The transfer circuit 94*b* transfers the waveform signal FIRE and the selection signal SIN received from the output circuit 94*a* to the driver IC 14. The transfer circuit 94*b* has a LVDS (Low Voltage Differential Signaling) driver installed therein and corresponding to each of the signals FIRE and SIN, and transfers each of the signals FIRE and SIN to the driver IC 14, as a pulse-shaped differential signal.

The ASIC 94 controls the driver IC 14 in the recording processing, generates the driving signal based on the waveform signal FIRE and the selection signal SIN for each pixel, and supplies the driving signal to each of the plurality of individual electrodes 13*c* via the signal line 14s. With this, the ASIC 94 causes the head 10 to discharge, for each pixel, the ink of which droplet amount is selected from the four kinds of liquid droplet amounts (zero, small, medium and large) from each of the plurality of nozzles N toward the paper sheet P. Namely, the recording processing corresponds to a " discharging processing" of the present disclosure.

The ASIC 94 is electrically connected also to a bar code reader 61 and a temperature sensor 62, in addition to the driver IC 14, the carriage motor 30*m* and the conveying motor 50*m*. The bar code reader 61 is capable of reading a bar code adhered to the head 10, and outputs, to the ASIC 94, read data obtained by reading the bar code (data indicating a discharging performance rank and a voltage rank, as will be described later on). The temperature sensor 62 detects an environmental temperature of the head 10, and outputs data indicating the environmental temperature to the ASIC 94.

Next, an explanation will be given about a program executed by the CPU 91, with reference to FIGS. 5 to 7. The program is executed after the controller 90 receives the recording instruction from the external apparatus 200, etc.

Figure 5A:
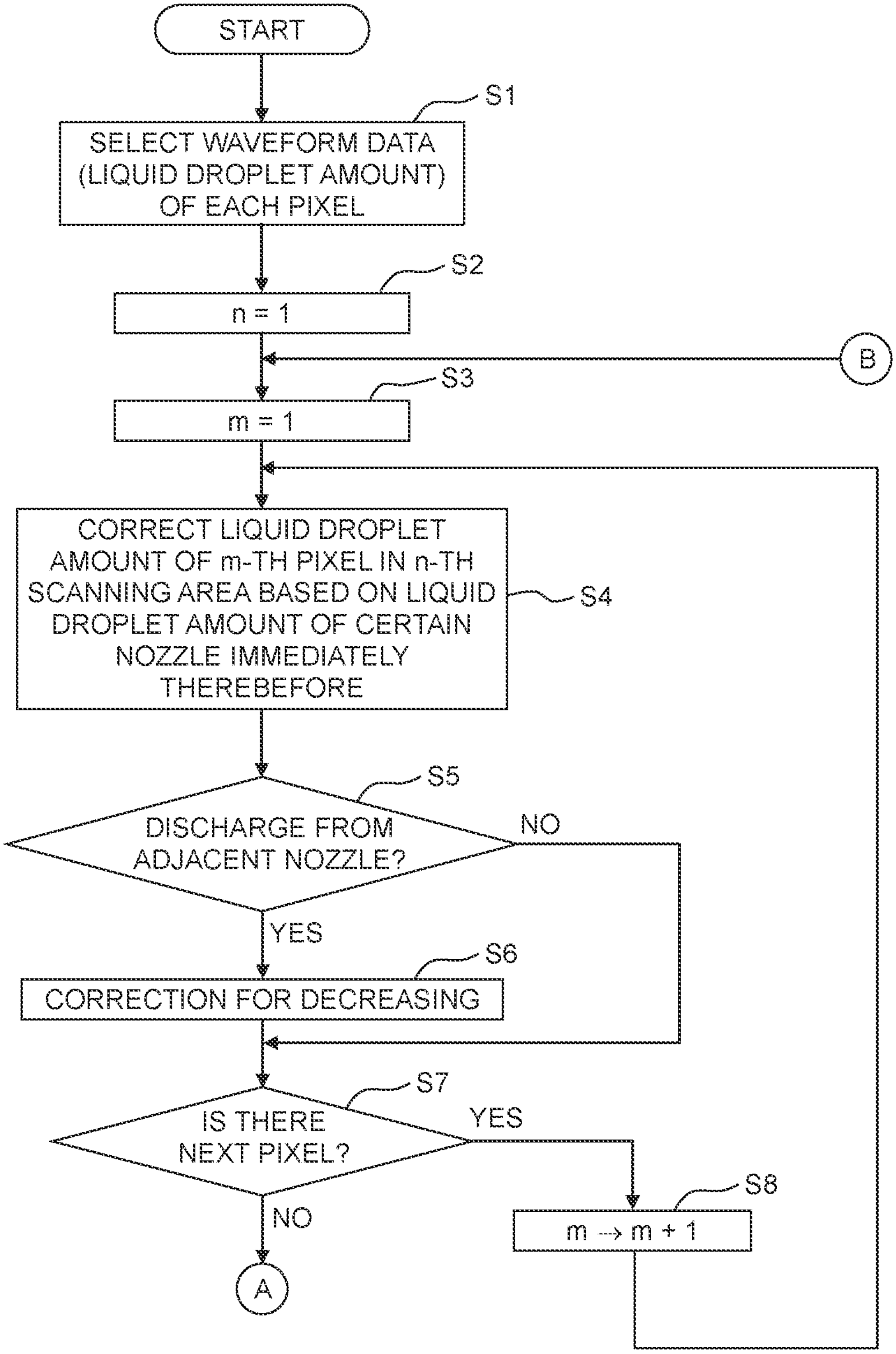
FIGS. 5A and 5B are a flow chart indicating a program executed by a CPU of the printer of FIG. 1.

As depicted in FIG. 5A, the CPU 91 firstly performs selection of the waveform for each pixel among the four pieces of waveform data F0 to F3 (see FIGS. 4A to 4D) (step S1). Each of the four pieces of waveform data F0 to F3 corresponds to the liquid droplet amount as described above, and the selection is made among the four pieces of waveform data F0 to F3, based on the image data included in the recording instruction.

Note that the image data may be either one of RGB (Red, Green, Blue) data corresponding to the color of the image, and CMYK (Cyan, Magenta, Yellow, Black) data corresponding to the color of the ink(s). For example, it is allowable that the external apparatus 200 transmits the RGB data to the controller 90, and that the CPU 91 makes the selection among the four pieces of waveform data F0 to F3, based on the RGB data. Alternatively, it is allowable that the external apparatus 200 converts the RGB data into the CMYK data and transmits the converted CMYK data to the controller 90, and that the CPU 91 makes the selection among the four pieces of waveform data F0 to F3, based on the CMYK data.

After step S1, the CPU 91 makes "n" to be "1" (step S2). The "n" is a number given for each area (scanning area R: see FIG. 6), on the paper sheet P, corresponding to one time of the scanning operation. The scanning area R is a rectangular area extending in the scanning direction, and a plurality of pieces of the scanning area R are arranged side by side in the conveying direction.

After step S2, the CPU 91 makes "m" to be "1" (step S3). The "m" is a number given for each of pixels included in one scanning area R.

After step S3, the CPU 91 corrects the liquid droplet amount of a m-th pixel in a n-th scanning area selected in step S1 based on a liquid droplet amount which is immediately before the liquid droplet amount of a certain nozzle N (namely, a nozzle N, among the plurality of nozzles N, which discharges the ink constructing the m-th pixel in the n-th scanning area) (step S4). In other words, in step S4, the CPU 91 corrects the liquid droplet amount selected for each of the pixels (in this case, the m-th pixel in the n-th scanning area), based on the liquid droplet amount of the ink to be discharged from the certain nozzle N at a timing before a certain timing at which the ink is to be discharged from the certain nozzle.

Specifically, in step S4, the CPU 91 reads a correction value which corresponds to the certain nozzle N from a table as depicted in FIG. 7A and stored in the ROM 92 (a table in which a combination of a recording cycle T1 and a recording cycle T2 and the correction value are associated to each other), and corrects the liquid droplet amount.

The recording cycle T1 corresponds to a "first recording cycle" of the present disclosure, and the recording cycle T2 corresponds to a "second recording cycle" of the present disclosure. The recording cycle T2 is a cycle corresponding to a pixel as an object (target) of the correction in step S4, and is a recording cycle which is after the recording cycle T1 and which is adjacent to the recording cycle T1. The recording cycle T1 is a recording cycle which is before the recording cycle T2 and which is adjacent to the recording cycle T2. Namely, the recording cycle T1 and the recording cycle T2 are consecutive cycles.

In the present embodiment, in step S4, the CPU 91 corrects the liquid droplet amount by multiplying the liquid droplet amount by a correction value A, correction value B or correction value C. The correction value B is 1 (one), the correction value A is a value greater than 1, and the correction value C is a value greater than 0 (zero) and smaller than 1. In a case of the correction value B, the correction is not performed; in a case of the correction value A, a correction of increasing the liquid droplet amount is performed; and in a case of the correction value C, a correction of decreasing the liquid droplet amount is performed.

In step S4, in a case that the liquid droplet amount corresponding to the recording cycle T1 is same as or greater than the liquid droplet amount corresponding to the recording cycle T2, the CPU 91 performs the correction so as to increase the liquid droplet amount corresponding to the recording cycle T2. For example, as in a first row of a table in FIG. 7A, in a case that the liquid droplet amount corresponding to the recording cycle T1 is "large", and that the liquid droplet amount corresponding to the recording cycle T2 is "large"; and as in a second row of a table in FIG. 7A, in a case that the liquid droplet amount corresponding to the recording cycle T1 is "large", and that the liquid droplet amount corresponding to the recording cycle T2 is "small", the CPU 91 uses the correction value A to thereby correct the liquid droplet amount corresponding to the recording cycle T2 so as to increase the liquid droplet amount corresponding to the recording cycle T2.

In step S4, in a case that the liquid droplet amount corresponding to the recording cycle T1 is smaller than the liquid droplet amount corresponding to the recording cycle T2, the CPU 91 does not perform the correction with respect to the liquid droplet amount corresponding to the recording cycle T2. For example, as in a third row of a table in FIG. 7A, in a case that the liquid droplet amount corresponding to the recording cycle T1 is "medium", and that the liquid droplet amount corresponding to the recording cycle T2 is "large"; and as in a fourth row of a table in FIG. 7A, in a case that the liquid droplet amount corresponding to the recording cycle T1 is "small," and that the liquid droplet amount corresponding to the recording cycle T2 is "medium," the CPU 91 uses the correction value B. Namely, the correction is not performed.

In step S4, in a case that the liquid droplet amount corresponding to the recording cycle T1 is 0 (zero), the CPU 91 performs the correction so as to decrease the liquid droplet amount corresponding to the recording cycle T2. For example, as in a fifth row of a table in FIG. 7A, in a case that the liquid droplet amount corresponding to the recording cycle T1 is "0 (zero)" and that the liquid droplet amount corresponding to the recording cycle T2 is "small"; and as in a sixth row of a table in FIG. 7A, in a case that the liquid droplet amount corresponding to the recording cycle T1 is "0 (zero)" and that the liquid droplet amount corresponding to the recording cycle T2 is "large", the CPU 91 uses the correction value C to thereby correct the liquid droplet amount corresponding to the recording cycle T2 so as to decrease the liquid droplet amount corresponding to the recording cycle T2.

Note that the scanning operation includes a case of movement from one side (for example, the left side in FIG. 6) toward the other side (for example, the right side in FIG. 6) in the scanning direction (ordinary scanning operation), and a case of movement from the other side (for example, the right side in FIG. 6) toward the one side (for example, the left side in FIG. 6) in the scanning direction (reverse scanning operation). In the normal scanning operation and the reverse scanning operation, pixels which are to be formed at a timing prior to the m-th pixel are located in mutually opposite directions in the scanning direction. Specifically, in the normal scanning operation, a pixel which is to be formed at a timing prior to the m-th pixel is located on one side in the scanning direction (for example, the left side of FIG. 6), whereas in the reverse scanning operation, a pixel which is to be formed at a timing prior to the m-th pixel is located on the other side in the scanning direction (for example, the right side of FIG. 6).

After step S4, the CPU 91 determines whether or not the ink is to be discharged from a nozzle N, which is included in the plurality of nozzles N and which is an adjacent nozzle N to the certain nozzle N (the nozzle N which is included in the plurality of nozzles N and which discharges the ink constructing the m-th pixel in the n-th scanning area) at a same timing as the timing at which the ink constructing the m-th pixel is discharged from the certain nozzle N (step S5).

Here, the term "adjacent nozzle N" means one piece or a plurality of pieces of the nozzle N which does not/do not have any other nozzle(s) N intervening between the adjacent nozzle N and the certain nozzle N; there is no specific limitation to a direction in which the adjacent nozzle is arranged with respect to the certain nozzle N.

In a case that the CPU 91 determines that the ink is (to be) discharged at the same timing from the adjacent nozzle N (step S5: YES), the CPU 91 performs the correction of decreasing a liquid droplet amount obtained up to step S5 by, for example, multiplying the liquid droplet amount by the correction value C (step S6). Namely, in a case that the ink is to be discharged from the adjacent nozzle N adjacent to the certain nozzle N at a same timing as a timing at which the ink constructing the m-th pixel is discharged from the certain nozzle, the CPU 91 performs the correction so as to decrease the liquid droplet amount which has been selected for each of the pixels.

In a case that the CPU 91 determines that the ink is not (to be) discharged at the same timing from the adjacent nozzle N (step S5: NO), the CPU 91 advances the processing to step S7, without performing the correction of step S6.

After step S6, or after the CPU 91 determines that the ink is not (to be) discharged at the same timing from the adjacent nozzle N (step S5: NO), the CPU 91 determines whether or not there is a pixel which is next to the m-th pixel in the n-th scanning area (step S7).

In a case that the CPU 91 determines that there is a pixel which is next to the m-th pixel in the n-th scanning area (step S7: YES), the CPU 91 makes "m" to be "m+1" (step S8), and returns the processing to step S4.

In a case that the CPU 91 determines that there is not any pixel which is next to the m-th pixel in the n-th scanning area (step S7: NO), the CPU 91 calculates, with respect to all the pixels in the n-th scanning area, a total discharge amount of the ink which is to be discharged from the plurality of nozzles N with respect to the n-th scanning area in the recording processing, based on the liquid droplet amount which has been selected in step S1 and which has been corrected in step S4 and/or in step S6 as necessary, and based on the discharge duty of the n-th scanning area obtained from the image data (step S9). The term "discharge duty" means the density of the liquid droplets per unit area of the paper sheet P. Step S9 corresponds to a "total discharge amount calculating processing" of the present disclosure.

Specifically in step S9, the CPU 91 firstly accumulate (adds cumulatively) the liquid droplet amounts, of the respective pixels in the n-th scanning area, which have been selected and/or corrected as necessary in steps S1 to S8. Then, the CPU 91 reads a correction value with respect to the discharge duty of the n-th scanning area from a table as depicted in FIG. 7B and stored in the ROM 92 (a table in which the discharge duty and the correction value are associated to each other), and calculates the total discharge amount by multiplying the accumulated value by the correction value.

Note that, as the discharge duty is higher, the liquid droplet amount of the ink to be discharged from the nozzle N in a case that the actuator 13*x* is driven at a same driving signal becomes greater, due to a residual vibration inside the channel in the head, etc. In view of this, in the present embodiment, discharge duty 50% is set to be the reference (namely, the correction amount is set to be 1.0), a correction amount of discharge duty 60% is set to be 1.1, and a correction amount of discharge duty 40% is set to be 0.9. Namely, any correction is not performed for the discharge duty 50%, the correction for increasing the liquid droplet amount is performed for the discharge duty 60%, and the correction for decreasing the liquid droplet amount is performed for the discharge duty 40%.

After step S9, the CPU 91 determines whether or not there is a next scanning area with respect to the n-th scanning area (a scanning area R which is arranged on the upstream side in the conveying direction relative to the n-th scanning area) (step S10).

In a case that the CPU 91 determines that there is a next scanning area (step S10: YES), the CPU 91 makes "n" to be "n+1" (step S11), and returns the processing to step S3.

By the execution of steps S1 to S11, the total discharge amount of each of the scanning areas R (see FIG. 6) is calculated.

In a case that the CPU 91 determines that there is not any next scanning area (step S10: NO), the CPU 91 obtains a discharging performance rank (step S12). Step S12 corresponds to a "discharging performance obtaining processing" of the present disclosure. In step S12, the CPU 91 receives the read data outputted from the bar code reader 61 (see FIG. 3) via the ASIC 94, and obtains the discharging performance rank from the read data. The discharging performance rank is a rank regarding the discharging performance of the nozzle N based on the structure of the head 10 (channel structure, the diameter of the nozzle N, etc.).

In the present embodiment, as depicted in FIG. 7C, the discharging performance rank is classified into ranks 1 to 3. A liquid droplet amount of the ink to be discharged from the nozzle N in a case that the actuator 13*x* is driven at a same driving signal is greatest in the rank 1 and is smallest in the rank 3; the rank 2 is smaller than the rank 1 and greater than the rank 3.

After step S12, the CPU 91 obtains a voltage rank (step S13). Step S13 corresponds to a "voltage obtaining processing" of the present disclosure. In step S13, the CPU 91 receives the read data outputted from the bar code reader 61 (see FIG. 3) via the ASIC 94, and obtains the voltage rank from the read data. The voltage rank is a rank regarding the voltage outputted to the head 10. Specifically, the driver IC 14 of the head 10 is electrically connected to an electric circuit (not depicted in the drawings), and generates the driving signal based on the voltage outputted thereto from the electric circuit. The CPU 91 specifies, with respect to the electric circuit, the voltage corresponding to the voltage rank. The electric circuit outputs the voltage specified by the CPU 91 to the driver IC 14.

In the present embodiment, as depicted in FIG. 7D, the voltage rank is classified into ranks 1 to 3. A liquid droplet amount of the ink to be discharged from the nozzle N in a case that the actuator 13*x* is driven at a same driving signal is greatest in the rank 1 and is smallest in the rank 3; the rank 2 is smaller than the rank 1 and greater than the rank 3.

After step S13, the CPU 91 obtains an environmental temperature of the head 10 (step S14). Step S14 corresponds to an "environmental temperature obtaining step" of the present disclosure. In step S14, the CPU 91 receives data indicating the environmental temperature and outputted from the temperature sensor 62 (see FIG. 3) via the ASIC 94, and obtains the environmental temperature from the data.

Since the viscosity, etc., of the ink is changed due to the environmental temperature, even in a case that the actuator 13*x* is driven by the same driving signal, the liquid droplet amount of the ink discharged from the nozzle N is changed depending on the environmental temperature. Specifically, in a case that the environmental temperature is low, the viscosity of the ink becomes high, and the liquid droplet amount is decreased; whereas in a case that the environmental temperature is high, the viscosity of the ink becomes low, and the liquid droplet amount is increased (see FIG. 7E).

After step S14, the CPU 91 obtains a recording mode included in the recording instruction (step S15). Step S15 corresponds to a "mode obtaining processing" of the present disclosure. The recording mode is a mode of the recording processing; in the present embodiment, the recording mode has a high speed mode, a normal mode and a high image quality mode, as depicted in FIG. 7F. The recording resolution, driving frequency, etc., are different among the respective modes; and the liquid droplet amounts in the cases of using waveform data F2 and waveform data F3 corresponding to the liquid droplet amount "medium" and the liquid droplet amount "large" are different among the respective modes. Note that a liquid droplet amount in a case of using waveform data F1 corresponding to the liquid droplet amount "small" is same in all the modes.

After step S15, the CPU 91 corrects the total discharge amount calculated in step S9, based on the information obtained in each of steps S12 to S15.

In step S16, specifically, the CPU 91 reads a corresponding correction value from each of the tables stored in the ROM 92 and indicated in FIGS. 7C to 7F (the tables in each of which the correction value and one of the discharging performance rank, the voltage rank, the environmental temperature and the recording mode are associated with each other), and corrects the total discharge amount.

In the present embodiment, in step S16, the CPU 91 corrects the total discharge value by multiplying the total discharge value by the correction value A, the correction value B or the correction value C. The correction value B is 1 (one), the correction value A is the value greater than 1 (one), and the correction value C is the value greater than 0 (zero) and smaller than 1 (one). In a case that the correction value B is used, the correction is not performed; in a case that the correction value A is used, a correction of increasing the total discharge amount is performed; and in a case that the correction value C is used, a correction of decreasing the total discharge amount is performed.

For example, regarding each of the discharging performance rank (see FIG. 7C) and the voltage rank (see FIG. 7D), the rank 2 is made as the reference (namely, in a case of the rank 2, any correction is not performed); in a case of the rank 1 in which the liquid droplet amount becomes great, the correction of increasing the total discharge amount is performed. On the other hand, in a case of the rank 3 in which the liquid droplet amount becomes small, the correction of decreasing the total discharge amount is performed. Regarding the environmental temperature (see FIG. 7E), the environmental temperature is classified into three ranks which are "less than 10° C.", "in a range of" not less than 10° C. and less than 20° C., and "not less than 20° C. The rank "in a range of" not less than 10° C. and less than 20° C." is made as the reference (namely, any correction is not performed in a case of "in a range of not less than 10° C. and less than 20° C."), whereas in a case of the rank "less than 10° C." in which the viscosity of the liquid is high and the liquid droplet amount is decreased, the correction of decreasing the total discharge amount is performed. On the other hand, in a case of the rank "not less than 20° C." in which the viscosity of the liquid is low and the liquid droplet amount is increased, the correction of increasing the total discharge amount is performed. Regarding the recording mode (see FIG. 7F), the high speed mode is made as the reference (namely, in a case of the high speed mode, any correction is not performed), whereas in a case of the normal mode in which the liquid droplet amount becomes great, the correction of increasing the total discharge amount is performed. On the other hand, in a case of the high image quality mode in which the liquid droplet amount becomes small, the correction of decreasing the total discharge amount is performed.

After step S16, the CPU 91 ends the routine.

The CPU 91 may execute detection of a remining amount in the ink tank based on the total discharge amount calculated by the routine (and a notifying processing based on the remaining amount, etc.).

Figure 5B:
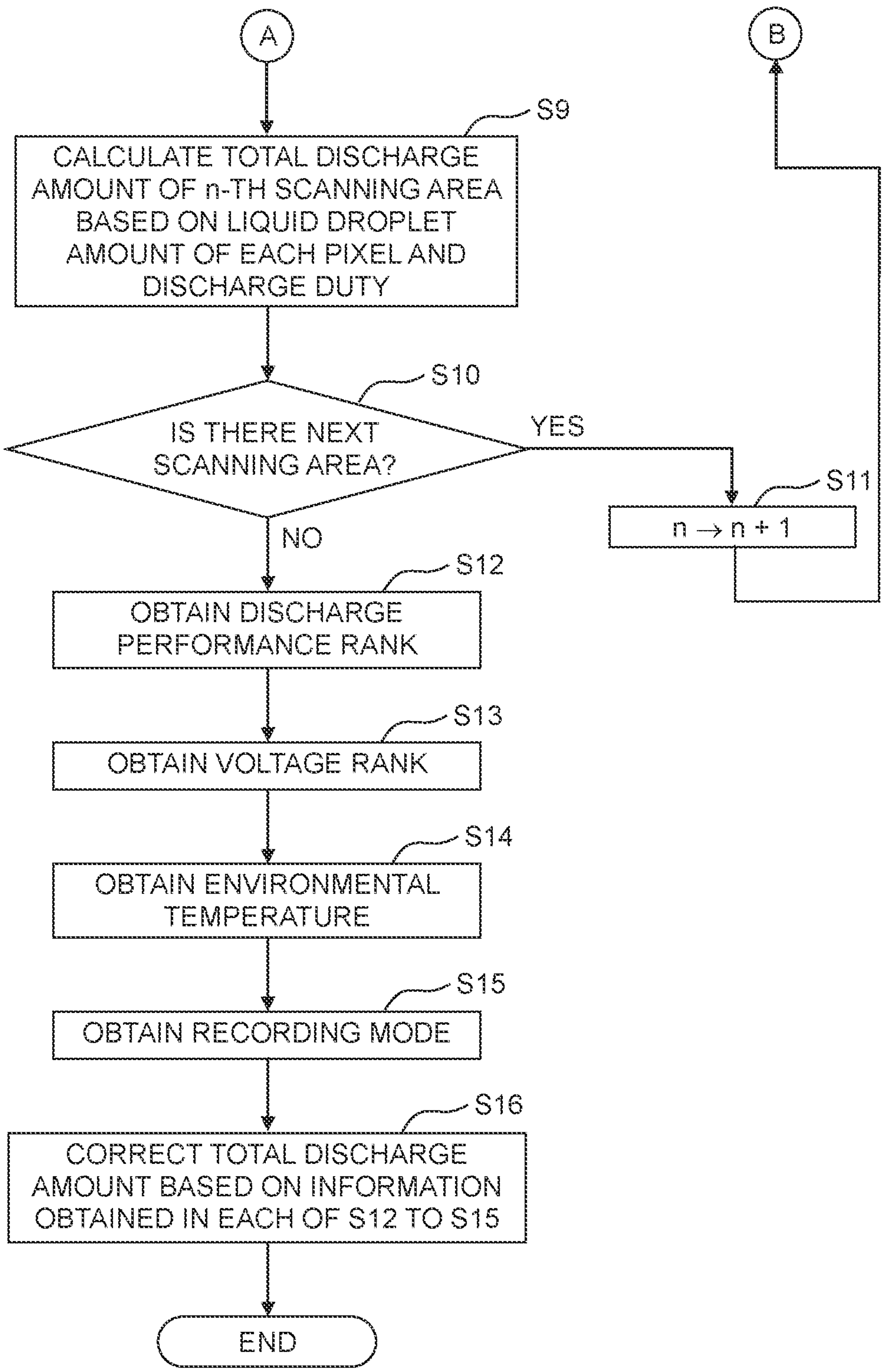

As described above, according to the present embodiment, the CPU 91 calculates the total discharge amount based on the discharge duty (see step S9 of FIG. 5B, and FIG. 7B). With this, it is possible to obtain the total discharge amount highly precisely.

Further, the CPU 91 calculates the total discharge amount based on the discharging performance (see steps S12 and S16 of FIG. 5B, and FIG. 7C). Even in a case that the actuator 13*x* is driven by the same driving signal, the liquid droplet amount of the ink discharged from the nozzle N is changed depending on the discharging performance. Accordingly, by calculating the total discharge amount based on the discharging performance, it is possible to obtain the total discharge amount more highly precisely.

Furthermore, the CPU 91 calculates the total discharge amount based on the voltage outputted to the head 10 (see steps S13 and S16 of FIG. 5B, and FIG. 7D). Even in a case that the actuator 13*x* is driven by the same driving signal, the liquid droplet amount of the ink discharged from the nozzle N is changed depending on the voltage outputted to the head 10. Accordingly, by calculating the total discharge amount based on the voltage, it is possible to obtain the total discharge amount more highly precisely.

Moreover, the CPU 91 calculates the total discharge amount based on the environmental temperature (see steps S14 and S16 of FIG. 5B, and FIG. 7E). Sine the viscosity, etc., of the ink change(s) depending on the environmental temperature, even in a case that the actuator 13*x* is driven by the same driving signal, the liquid droplet amount of the ink discharged from the nozzle N is changed depending on the environmental temperature. Accordingly, by calculating the total discharge amount based on the environmental temperature, it is possible to obtain the total discharge amount more highly precisely.

Further, the CPU 91 calculates the total discharge amount based on the recording mode (see steps S15 and S16 of FIG. 5B, and FIG. 7F). The recording resolution and/or the driving frequency is/are different depending on the recording mode, and the liquid droplet amounts in the case of using the waveform data F2 corresponding to the liquid droplet amount "medium" and the case of using the waveform data F3 corresponding to the liquid droplet amount "large" are different depending on the recording mode. Accordingly, by calculating the total discharge amount based on the recording mode, it is possible to obtain the total discharge amount more highly precisely.

Furthermore, the CPU 91 corrects the liquid droplet amount selected for each of the pixels based on the liquid droplet amount of the ink to be discharged from the certain nozzle N at a timing prior to the certain timing (see step S4 of FIG. 5A, and FIG. 7A). The liquid droplet amount of the current time is changed due to the residual vibration, inside the channel in the head, etc., generated in the discharge performed prior to the discharge to be performed the current time. Accordingly, by correcting the total discharge amount of the ink to be discharged at the certain timing, based on the liquid droplet amount of the ink discharged at the timing prior to the certain timing, it is possible to obtain the total discharge amount more highly precisely.

In a case that the liquid droplet amount corresponding to the recording cycle T1 is same as or greater than the liquid droplet amount corresponding to the recording cycle T2, the CPU 91 performs the correction so as to increase the liquid droplet amount corresponding to the recording cycle T2 (see the first and second rows in FIG. 7A). In a case that the liquid droplet amount of the previous time is same as or greater than the liquid droplet amount of the current time, the liquid droplet amount of the current time is increased due to the residual vibration, etc., generated at the discharge performed in the previous time. Accordingly, in such a case, by performing the correction so as to increase the liquid droplet amount of the current time, it is possible to obtain the total discharge amount more highly precisely.

In a case that the liquid droplet amount corresponding to the recording cycle T1 is 0 (zero), the CPU 91 performs the correction so as to decrease the liquid droplet amount corresponding to the recording cycle T2 (see the fifth and sixth rows in FIG. 7A). In the case that the liquid droplet amount of the previous time is 0 (zero), any residual vibration is not generated at the discharge performed the previous time, and the liquid droplet amount of the current time is decreased. Accordingly, in such a case, by performing the correction so as to decrease the liquid droplet amount of the current time, it is possible to obtain the total discharge amount more highly precisely.

Further, in a case that the ink is discharged from a second nozzle N adjacent to a first nozzle N, the CPU 91 performs the correction so as to decrease the liquid droplet amount selected for each of the pixels (see steps S5 and S6 in FIG. 5A). In a case that the ink is discharged from the second nozzle N adjacent to the first nozzle N, the liquid droplet amount of the ink discharged from the first nozzle N becomes to be small due to the influence of fluidic crosstalk. Accordingly, in such a case, by performing the correction so as to decrease the liquid droplet amount discharged from the first nozzle N, it is possible to obtain the total discharge amount more highly precisely.

Figure 6:
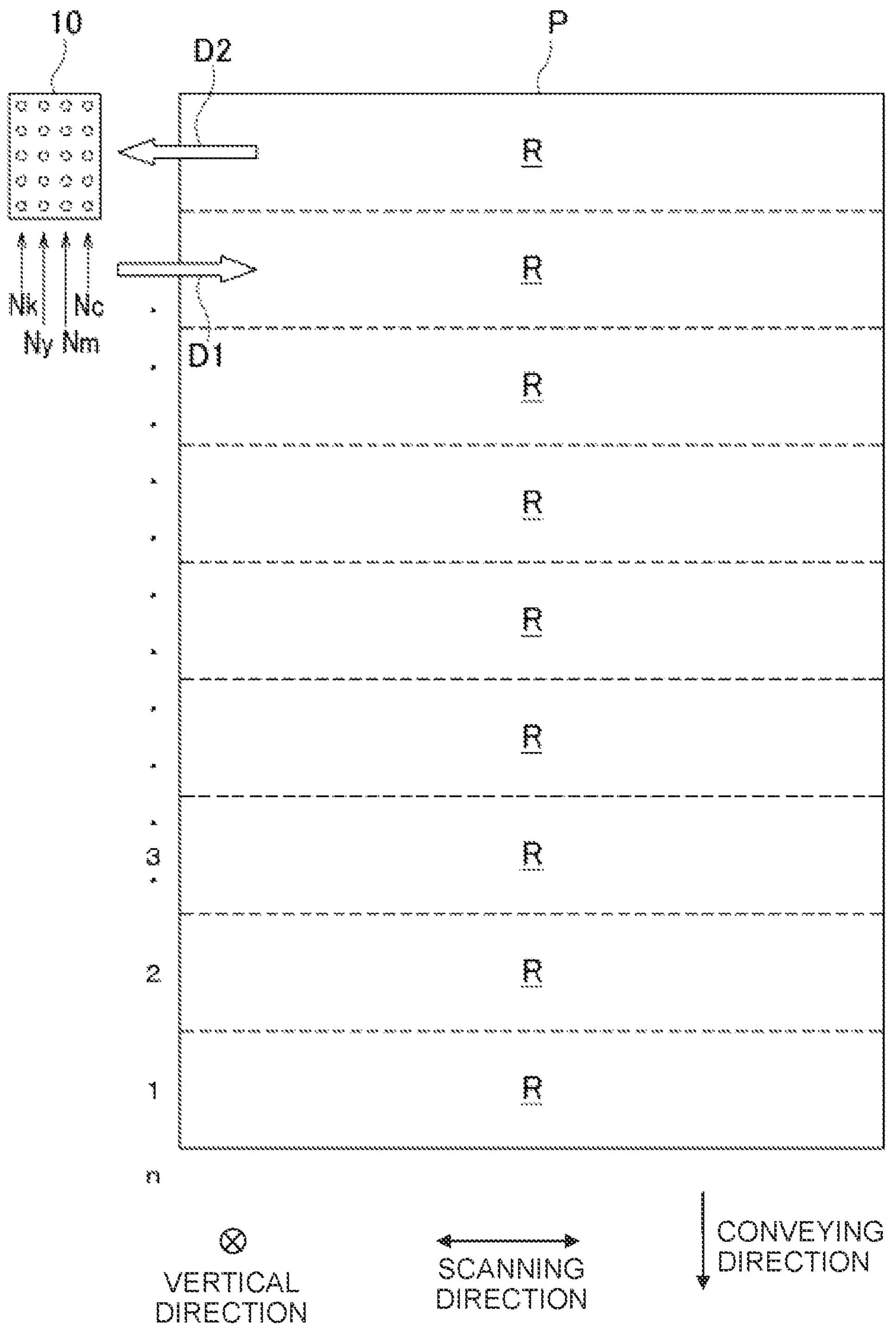
FIG. 6 is a schematic view depicting scanning areas of a paper sheet.

The CPU 91 calculates the total discharge amount for each of the scanning areas R (see steps S2 to S11 of FIGS. 5A, 5B, and FIG. 6). In this case, it is possible to obtain the total discharge amount highly precisely, as compared with a case of collectively calculating the total discharge amount of the entire area of the paper sheet P.

The table indicated in FIG. 7B (the table in which the discharge duty and the correction value are associated with each other) is stored in the ROM 92. In step S9, the CPU 91 reads out the correction value corresponding to the discharge duty from the table, and calculates the total discharge amount. With this, it is possible to execute the calculating processing efficiently.

Second Embodiment

Next, a second embodiment of the present disclosure will be explained, with reference to FIG. 8.

The second embodiment is similar to the first embodiment, except that the content of processing in step S9 of FIG. 5B is different from that of the first embodiment.

In the second embodiment, a table indicated in FIG. 8 (a table in which the discharge duty and a correction value for the color of each of the inks are associated with each other) is used, rather than the table indicated in FIG. 7B.

In step S9, the CPU 91 firstly performs correction, regarding the liquid droplet amount, of each of the pixels in the n-th scanning area, which is selected and/or corrected as necessary in steps S1 to S8, by using a correction amount corresponding to the discharge duty of the n-th scanning area, for each of the colors which are the cyan, magenta, yellow and black (for each of components, colorants). This correction is performed by multiplying the liquid droplet amount by the correction amount.

For example, in a case that the discharge duty of the n-th scanning area is 50%, the correction value is 1.0 for all the respective colors of cyan, magenta, yellow and black. Accordingly, the CPU 91 does not perform any correction in this case.

In a case that the discharge duty of the n-th scanning area is 60%, the correction value is determined to be 1.1 or 1.2 for each of the respective colors of cyan, magenta, yellow and black. Accordingly, in the case of the cyan or black, the CPU 91 performs the correction so as to increase the liquid droplet amount by multiplying the liquid droplet amount by 1.1. In the case of the magenta or yellow, the CPU 91 performs the correction so as to further increase the liquid droplet amount by multiplying the liquid droplet amount by 1.2.

In a case that the discharge duty of the n-th scanning area is 40%, the correction value is determined to be 0.8 or 0.9 for each of the respective colors of cyan, magenta, yellow and black. Accordingly, in the case of the cyan or black, the CPU 91 performs the correction so as to decrease the liquid droplet amount by multiplying the liquid droplet amount by 0.9. In the case of the magenta or yellow, the CPU 91 performs the correction so as to further decrease the liquid droplet amount by multiplying the liquid droplet amount by 0.8.

After correcting the liquid droplet amount of each of the pixels, the CPU 91 accumulates the liquid droplet amounts after the correction to thereby calculate the total discharge amount.

As described above, according to the second embodiment, the CPU 91 calculates the total discharge amount also based on the component of the ink, not only on the discharge duty (see FIG. 8). Depending on the component of the ink, the viscosity, etc., of the ink is changed, and the liquid droplet amount of the ink to be discharged from the nozzle is also changed. Specifically, an ink is mainly composed of a solvent, a colorant, a resin, and another additive(s), etc.; the viscosity, etc., of the ink is different depending on the kind and/or ratio of the respective components. Accordingly, by calculating the total discharge amount based on the component of the ink, it is possible to obtain the total discharge amount more highly precisely.

Further, by focusing on the colorant (color) in particular as the component of the ink, it is possible to obtain the total discharge amount more highly precisely, in a color printer, etc.

Third Embodiment

Next, a third embodiment of the present disclosure will be explained, with reference to FIG. 9.

The third embodiment is similar to the first embodiment, except that the content of processing in step S9 of FIG. 5B is different from that of the first embodiment.

In the third embodiment, a table indicated in FIG. 9 (a table in which the discharge duty, a ratio of the liquid droplet amount(s), and a correction value are associated with one another) is used, rather than the table indicated in FIG. 7B.

In step S9, specifically, the CPU 91 firstly accumulates the liquid droplet amounts, each of which selected and/or corrected as necessary in steps S1 to S8, of the respective pixels of the n-th scanning area. Then, the CPU 91 reads out, from the table indicated in FIG. 9 and stored in the ROM 92, the discharge duty of the n-th scanning area and a correction amount corresponding to the ratio of liquid droplet amounts of the n-th scanning area, and calculates the total discharge amount by multiplying the accumulated value by the correction amount. Namely, in step S9, the CPU 91 calculates the total discharge amount based on the ratio of liquid droplet amounts.

For example, even in a case that the discharge duty of the n-th scanning area is 50%, the correction value is different among a case that the ratio of liquid droplet amounts in the discharge duty of the n-th scanning area is "small": 0%, "medium": 0% and "large" 100%; a case that the ratio of liquid droplet amounts in the discharge duty of the n-th scanning area is: "small": 0%, "medium": 10%, and "large": 90%; and a case that the ratio of liquid droplet amounts in the discharge duty of the n-th scanning area is "small": 0%, "medium": 20%, and "large": 80%. Accordingly, even with the same discharge duty, the calculated total discharge amount is different depending on the ratio of liquid droplet amounts. It is similarly applicable to a case that the discharge duty is different from 50% (namely, the discharge duty is 60%, 40%, etc.).

As described above, according to the third embodiment, the CPU 91 calculates the total discharge amount also based on the ratio of liquid droplet amounts (small, medium and large), not only on the discharge duty (see FIG. 9). Even with the same discharge duty, the liquid droplet amount of the ink discharged from the nozzle is changed depending on the ratio of liquid droplet amounts (small, medium and large). Accordingly, by calculating the total discharge amount based on the ratio of liquid droplet amounts, it is possible to obtain the total discharge amount more highly precisely.

Fourth Embodiment

Next, a fourth embodiment of the present disclosure will be explained.

The fourth embodiment is similar to the first embodiment, except that the content of processing in step S9 of FIG. 5B is different from that of the first embodiment.

In the fourth embodiment, in step S9, the CPU 91 uses the following formula, rather than using the table indicated in FIG. 7B.

$$X=A\times k(\alpha/50) \quad \text{[Formula 1]}$$

(X: total discharge amount, A: cumulatively added value, k: coefficient, α: discharge duty (%))

Specifically, in step S9, the CPU 91 firstly accumulates the liquid droplet amounts, each of which selected and/or corrected as necessary in steps S1 to S8, of the respective pixels of the n-th scanning area. Then, the CPU 91 calculates the total discharge amount X of the n-th scanning area by applying a value obtained by the accumulation (cumulatively added value A) and the discharge duty α (%) of the n-th scanning area to the above-described formula.

Generally, as the discharge duty is higher, the liquid droplet amount of the ink to be discharged from the nozzle N in a case that the actuator 13$x$ is driven by the same driving signal becomes greater due to the residual vibration in the inside of the channel of the head, etc. In view of this, in the fourth embodiment, the discharge duty 50% is made as the reference as indicated by the above-described formula, and the CPU 91 performs the correction so as to increase the discharge amount in a case that the discharge duty is higher than 50%, whereas the CPU 91 performs the correction so as to decrease the discharge amount in a case that the discharge duty is lower than 50%.

Fifth Embodiment

Figure 10:
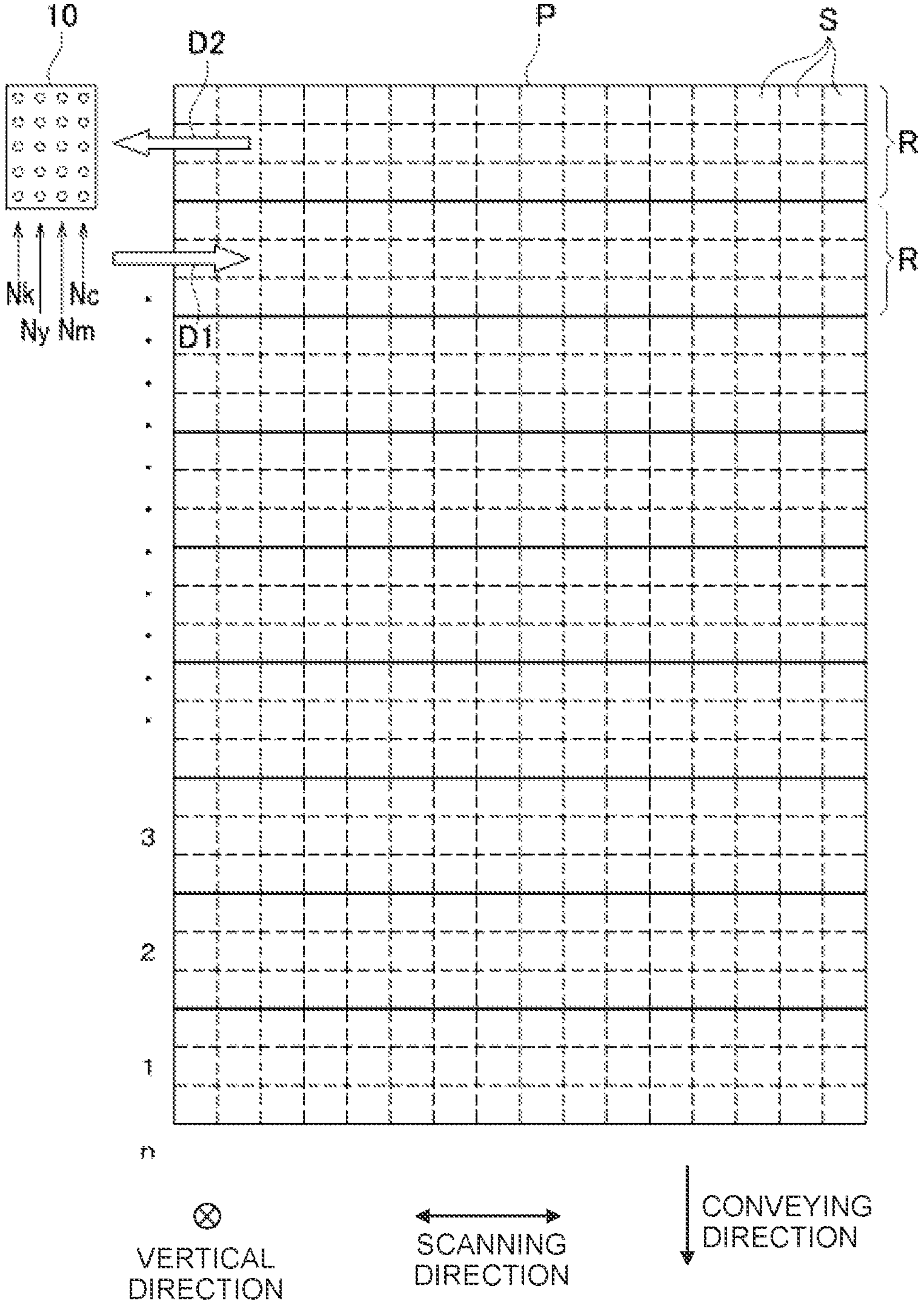
FIG. 10 is a schematic view depicting divided areas obtained by dividing each of the scanning areas, of the paper sheet, into a plurality of areas (sections).

Next, a fifth embodiment of the present disclosure will be explained, with reference to FIG. 10.

In the first embodiment, the CPU 91 calculates the total discharge amount for each of the scanning areas R (see steps S2 to S11 of FIGS. 5A and 5B). In contrast, in the fifth embodiment, the CPU 91 calculates the total discharge amount for each of divided areas S which is obtained by subdividing each of the scanning areas R into a plurality of divided areas (sections).

According to the fifth embodiment, by calculating the total discharging amount for each of the divided areas S which are obtained by subdividing one of the scanning areas R, it is possible to obtain the total discharge amount for each of the areas highly precisely.

Modifications

Although the embodiments of the present disclosure have been explained in the foregoing, the present disclosure is not limited to or restricted by the above-described embodiments, and various design changes can be made within the scope of the claims.

For example, in the first embodiment (see FIGS. 7A to 7F), although the CPU 91 corrects the total discharge amount by multiplying the total discharge amount by the correction value, the present disclosure is not limited to this. In the present disclosure, the correction of the total discharge amount includes addition, deduction, multiplication, division, etc., with respect to the calculated total discharge amount by the correction value.

In the first embodiment (see FIGS. 5A and 5B), although the CPU 91 performs the correction of the liquid droplet amount of the m-th pixel of the n-th scanning area based on the liquid droplet amount immediately therebefore, the present disclosure is not limited to this. It is allowable to perform the correction, for example, based on two liquid droplet amounts which are the liquid droplet amount immediately therebefore and another liquid amount before the liquid droplet amount immediately therebefore.

In the above-described embodiment, although the CPU 91 collectively adds the liquid droplet amounts of "small", "medium" and "large" to thereby calculate the total discharge amount, the present disclosure is not limited to this. In this case, it is also allowable that the CPU 91 calculates the total discharge amount for each of the liquid droplet amounts of "small", "medium" and "large". In this case, it is allowable that, for example, after the CPU 91 accumulates the liquid droplet amounts "small", the CPU 91 corrects the cumulatively added value based on the discharge duty corresponding to the liquid droplet amount "small" to thereby calculate the total discharge amount.

In the above-described embodiment, in the recording processing (discharging processing), the CPU 91 discharges the liquid of the liquid droplet amount selected from the four kinds of liquid droplet amounts (zero, small, medium, large) toward the recording medium. The present disclosure, however, is not limited to this. For example, it is allowable that the CPU 91 discharges the liquid of a liquid droplet amount selected from three kinds of liquid droplets (zero, small, large) toward the recording medium, or that the CPU 91 discharges the liquid of a liquid droplet amount selected from not less than five kinds of liquid droplets (zero, small, medium, large, extra-large) toward the recording medium.

The total discharge amount calculating processing may be executed either before and after the execution of the discharging processing.

Although the head in the above-described embodiment is of the serial system, the head may be of the line system.

The liquid discharged from the nozzles is not limited to the ink, and may be a liquid which is different from the ink (e.g., a treatment liquid which agglutinates or precipitates a component of ink, etc.).

The recording medium is not limited to the paper sheet (paper), and may be, for example, a cloth, a resin member, etc.

The present disclosure is also applicable to facsimiles, copy machines, multifunction peripherals, etc. without being limited to printers. The present disclosure is also applicable to a liquid discharge apparatus used for any other application than the image recording (e.g., a liquid discharging apparatus which forms an electroconductive pattern by discharging an electroconductive liquid on a substrate).

The program according to the present disclosure is distributable by being recorded or stored on a removable-type recording medium such as a flexible disk, etc., and on a fixed-type recording medium such as a hard disk, etc., and is also distributable via a telecommunication line.

Figure 11A:
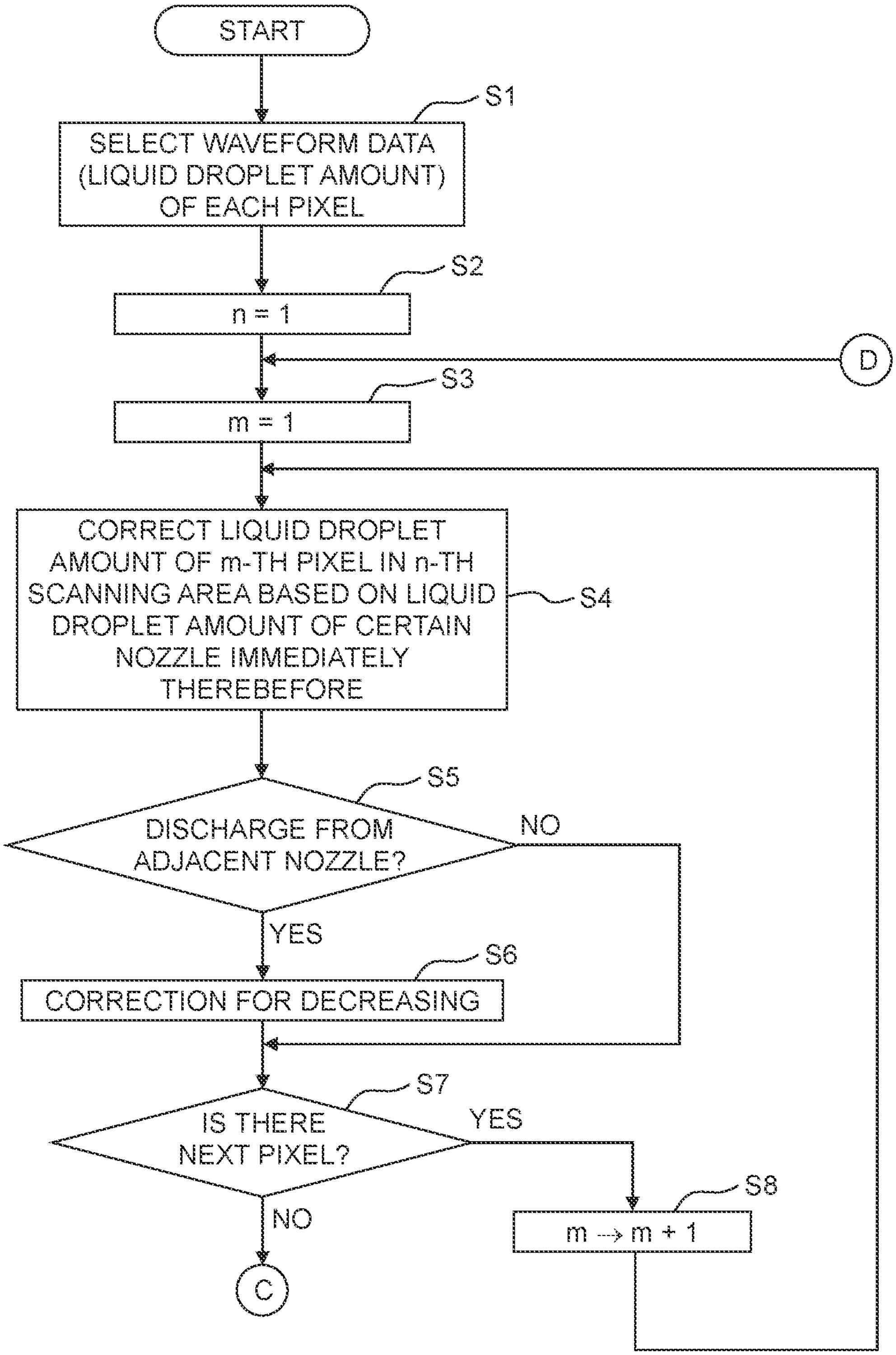
FIGS. 11A and 11B are a flow chart indicating a program according to a reference example of the present disclosure.
Figure 11B:
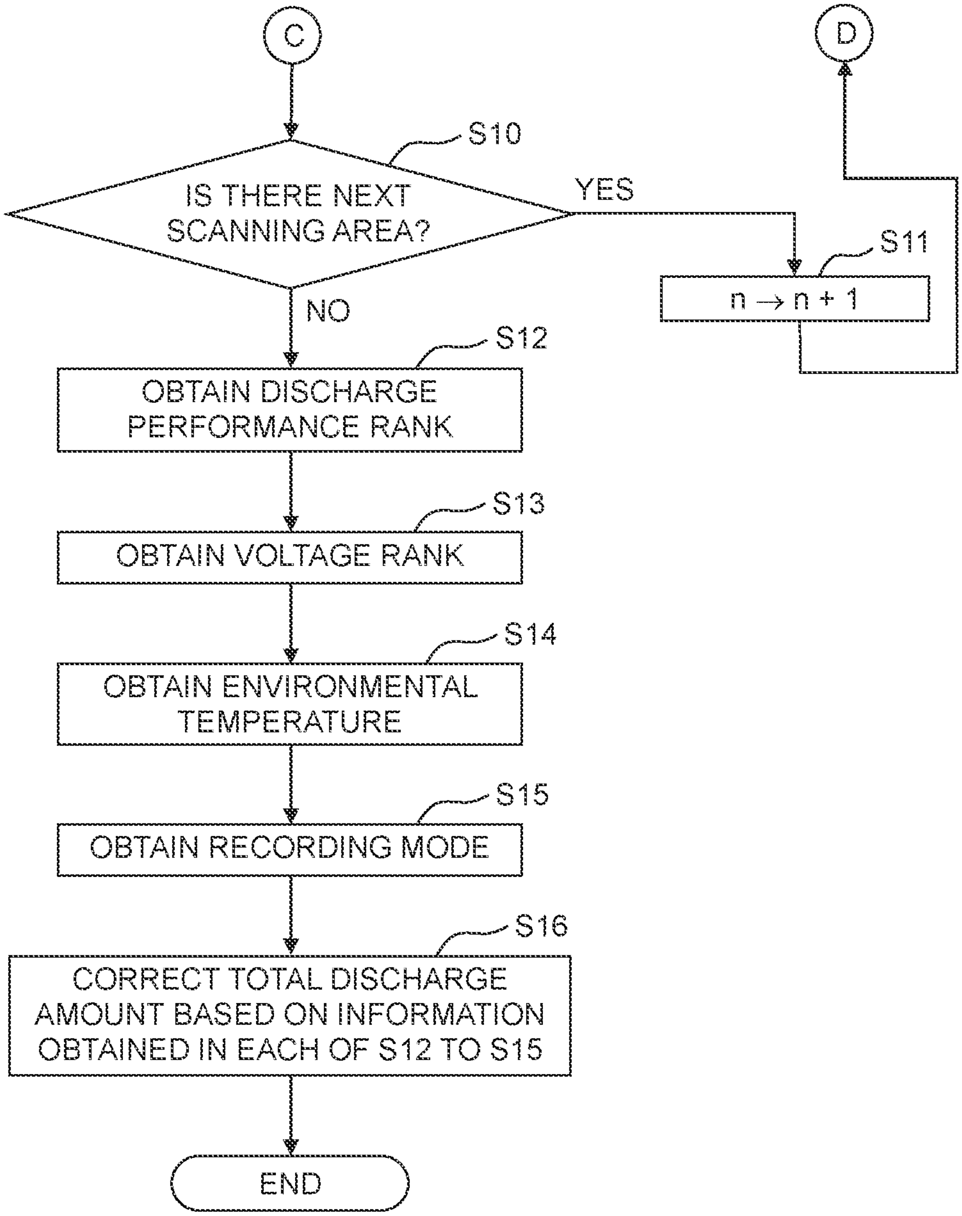

Further, in a reference example of the present disclosure, the CPU of the printer may execute a program as depicted in FIGS. 11A and 11B. The program of FIGS. 11A and 11B is a program in which step S9 of FIG. 5B is omitted. In this reference example, although the correction based on the discharge duty is not performed in the calculation of the total discharge amount, the other corrections (a correction of the liquid droplet amount selected for each of the pixels based on the liquid droplet amount of the liquid discharged from the certain nozzle at a timing before a certain timing (step S4); and a correction of the liquid droplet amount selected for each of the pixels based on the discharging performance, voltage, the environmental temperature and the recording mode (step S16)) are performed.

What is claimed is:

1. A liquid discharging apparatus comprising:

a head having a plurality of nozzles and having a code adhered to the head, the code indicating a voltage rank regarding a voltage outputted to the head;

a code reader configured to read the code; and a controller, wherein the controller is configured to execute:

a discharging processing of discharging liquid, from each of the nozzles toward a recording medium, in a liquid droplet amount which is selected for each of pixels from at least three kinds of liquid droplet amounts while moving the head along each of a plurality of scanning areas on the recording medium;

a total discharge amount calculating processing of calculating a total discharge amount of the liquid to be discharged from the nozzles in the discharging processing, based on the liquid droplet amount selected for each of the pixels and a discharge duty which is density of the liquid droplet per a unit area of the recording medium;

a determining processing of determining whether or not there is a next scanning area;

a voltage obtaining processing of obtaining the voltage rank from the code read by the code reader, if the controller determines in the determining processing that there is not the next scanning area; and a correcting processing of correcting the total discharge amount by using a correction value corresponding to the voltage rank.

2. The liquid discharging apparatus according to claim 1, wherein in the total discharge amount calculating processing, the controller is configured to calculate the total discharge amount based on a component of the liquid.

3. The liquid discharging apparatus according to claim 2, wherein the component includes a colorant.

4. The liquid discharging apparatus according to claim 1, wherein in the total discharge amount calculating processing, the controller is configured to calculate the total discharge amount based on a ratio of the liquid droplet amount constructing the density.

5. The liquid discharging apparatus according to claim 1, wherein in the total discharge amount calculating processing, the controller is configured to correct the liquid droplet amount selected for each of the pixels, based on the liquid droplet amount of the liquid to be discharged at a certain timing from a certain nozzle, among the nozzles, at a timing which is before the certain timing.

6. The liquid discharging apparatus according to claim 1, wherein the nozzles include a first nozzle discharging the liquid constructing a certain pixel and a second nozzle adjacent to the first nozzle, and wherein in a case that the liquid is discharged from the second nozzle at a same timing as a timing at which the liquid constructing the certain pixel is discharged from the first nozzle, the controller is configured to correct the liquid droplet amount selected with respect to the certain pixel so as to decrease the liquid droplet amount selected with respect to the certain pixel, in the total discharge amount calculating processing.

7. The liquid discharging apparatus according to claim 1, further comprising:

a scanning mechanism configured to move the head in a scanning direction; and a conveyor configured to convey the recording medium in a conveying direction orthogonal to the scanning direction, wherein in the discharging processing, the controller is configured to execute a conveying operation of causing the conveyor to convey the recording medium in the conveying direction by a predetermined amount, and a scanning operation of discharging the liquid from the nozzles while causing the scanning mechanism to move the head in the scanning direction, and wherein in the total discharge amount calculating processing, the controller is configured to calculate the total discharge amount for each of the scanning areas of the recording medium, each of the scanning areas being an area which overlaps with the head while the controller causes the head and the scanning mechanism to execute one time of the scanning operation.

8. The liquid discharging apparatus according to claim 7, wherein in the total discharge amount calculating processing, the controller is configured to calculate the total discharge amount for each of divided areas, the divided areas being obtained by dividing each of the scanning areas into a plurality of areas.

9. The liquid discharging apparatus according to claim 1, further comprising a memory configured to store therein a table in which the discharge duty and a corrected value are associated with each other, wherein in the total discharge amount calculating processing, the controller is configured to calculate the total discharge amount based on the correction value corresponding to the discharge duty and read from the table.

10. A liquid discharging apparatus comprising:

a head having a plurality of nozzles; and a controller, wherein the controller is configured to execute:

a discharging processing of discharging liquid, from each of the nozzles toward a recording medium, in a liquid droplet amount which is selected for each of pixels from at least three kinds of liquid droplet amounts; and a total discharge amount calculating processing of calculating a total discharge amount of the liquid to be discharged from the nozzles in the discharging processing, based on the liquid droplet amount selected for each of the pixels and a discharge duty which is density of the liquid droplet per a unit area of the recording medium, wherein in the total discharge amount calculating processing, the controller is configured to correct the liquid droplet amount selected for each of the pixels, based on the liquid droplet amount of the liquid to be discharged at a certain timing from a certain nozzle, among the nozzles, at a timing which is before the certain timing, wherein each of the pixels corresponds to one piece of a recording cycle, wherein the recording cycle includes a first recording cycle, and a second recording cycle which is a recording cycle after the first recording cycle, and which is adjacent to the first recording cycle, and wherein in the total discharge amount calculating processing, in a case that the liquid droplet amount corresponding to the first recording cycle is same as or greater than the liquid droplet amount corresponding to the second recording cycle, the controller is configured to correct the liquid droplet amount corresponding to the second recording cycle so as to increase the liquid droplet amount corresponding to the second recording cycle.

11. A liquid discharging apparatus comprising:

a head having a plurality of nozzles; and a controller, wherein the controller is configured to execute:

a discharging processing of discharging liquid, from each of the nozzles toward a recording medium, in a liquid droplet amount which is selected for each of pixels from at least three kinds of liquid droplet amounts; and a total discharge amount calculating processing of calculating a total discharge amount of the liquid to be discharged from the nozzles in the discharging processing, based on the liquid droplet amount selected for each of the pixels and a discharge duty which is density of the liquid droplet per a unit area of the recording medium, wherein in the total discharge amount calculating processing, the controller is configured to correct the liquid droplet amount selected for each of the pixels, based on the liquid droplet amount of the liquid to be discharged at a certain timing from a certain nozzle, among the nozzles, at a timing which is before the certain timing, wherein each of the pixels corresponds to one piece of a recording cycle, wherein the recording cycle includes a first recording cycle, and a second recording cycle which is a recording cycle after the first recording cycle, and which is adjacent to the first recording cycle, and wherein in the total discharge amount calculating processing, in a case that the liquid droplet amount corresponding to the first recording cycle is zero, the controller is configured to correct the liquid droplet amount corresponding to the second recording cycle so as to decrease the liquid droplet amount corresponding to the second recording cycle.

* * * * *